(12) United States Patent
Filipenco

(10) Patent No.: US 11,125,187 B2
(45) Date of Patent: Sep. 21, 2021

(54) TURBOMACHINERY TRANSITION DUCT FOR WIDE BYPASS RATIO RANGES

(71) Applicant: UNITED TECHNOLOGIES CORPORATION, Farmington, CT (US)

(72) Inventor: Victor G. Filipenco, Portland, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 116 days.

(21) Appl. No.: 16/052,022

(22) Filed: Aug. 1, 2018

(65) Prior Publication Data

US 2020/0040847 A1 Feb. 6, 2020

(51) Int. Cl.
| F02K 3/075 | (2006.01) |
| F02C 3/13 | (2006.01) |
| F02C 9/18 | (2006.01) |
| F02K 3/06 | (2006.01) |

(52) U.S. Cl.
CPC .............. *F02K 3/075* (2013.01); *F02C 3/13* (2013.01); *F02C 9/18* (2013.01); *F02K 3/06* (2013.01); *F05D 2220/36* (2013.01); *F05D 2240/12* (2013.01); *F05D 2260/606* (2013.01); *F05D 2270/101* (2013.01)

(58) Field of Classification Search
CPC . F02K 3/06; F02K 3/075; F02K 3/025; F02K 3/04; F02K 3/068; F02K 3/077; F02C 3/13; F02C 7/04; F02C 7/042; F02C 7/047; F02C 9/18; F05D 2220/36; F05D 2240/12; F05D 2260/606; F05D 2270/101
See application file for complete search history.

(56) References Cited

U.S. PATENT DOCUMENTS

| 3,477,231 | A | * | 11/1969 | Paulson | .................. | F02C 7/045 |
| | | | | | | 60/269 |
| 3,925,979 | A | * | 12/1975 | Ziegler | .................. | F02C 7/047 |
| | | | | | | 60/785 |
| 4,064,692 | A | | 12/1977 | Johnson et al. | | |
| 4,069,661 | A | | 1/1978 | Rundell et al. | | |
| 4,080,785 | A | * | 4/1978 | Koff | ......................... | F02K 1/16 |
| | | | | | | 60/226 |

(Continued)

FOREIGN PATENT DOCUMENTS

| EP | 1522710 A2 | 4/2005 |
| EP | 3306068 A1 | 4/2018 |

(Continued)

OTHER PUBLICATIONS

European Search Report for Application No. EP 19 17 7522.

*Primary Examiner* — Jason H Duger
(74) *Attorney, Agent, or Firm* — Cantor Colburn LLP

(57) ABSTRACT

A gas turbine engine includes a case assembly, a splitter, an upstream blade row, and a transition duct. The case assembly defines an outer flow path wall and an inner flow path wall. The splitter is disposed between the outer flow path wall and the inner flow path wall. The splitter has a first surface and a second surface disposed opposite the first surface. The transition duct is defined by the outer flow path and the inner flow path and extends between the upstream blade row and the leading edge of the splitter.

12 Claims, 2 Drawing Sheets

(56) References Cited

U.S. PATENT DOCUMENTS

| | | | | |
|---|---|---|---|---|
| 5,809,772 | A | * | 9/1998 | Giffin, III .............. F02K 3/075 |
| | | | | 60/226.1 |
| 7,200,999 | B2 | * | 4/2007 | Bagnall ................. B64C 21/06 |
| | | | | 60/226.1 |
| 2007/0000232 | A1 | | 1/2007 | Powell et al. |
| 2016/0273373 | A1 | * | 9/2016 | Filipenco ................. F01D 9/04 |
| 2018/0094582 | A1 | | 4/2018 | Roseanau et al. |

FOREIGN PATENT DOCUMENTS

| | | |
|---|---|---|
| WO | 2005012696 A1 | 2/2005 |
| WO | 2015077011 A1 | 5/2015 |

* cited by examiner

TURBOMACHINERY TRANSITION DUCT FOR WIDE BYPASS RATIO RANGES

STATEMENT OF FEDERAL SUPPORT

This invention was made with Government support under US Government Contract Number FA8650-09-D-2923-0018 awarded by The U.S. Air Force. The Government has certain rights in the invention.

BACKGROUND

Exemplary embodiments of the present disclosure pertain to the art of gas turbine engines.

Some gas turbine engines may be arranged to vary or modify a bypass ratio in order to achieve improved engine efficiency over a wide flight envelope.

BRIEF DESCRIPTION

Disclosed is a gas turbine engine that includes a case assembly, a splitter, an upstream blade row, and a transition duct. The case assembly defines an outer flow path wall and an inner flow path wall, each extending between a first case end and a second case end along a central longitudinal axis. The splitter is disposed between the outer flow path wall and the inner flow path wall. The splitter has a first surface and a second surface disposed opposite the first surface, each extending from the second case end towards a leading edge. The upstream blade row is disposed proximate the first case end and extends between the outer flow path wall and the inner flow path wall. The transition duct is defined by the outer flow path and the inner flow path and extends between the upstream blade row and the leading edge. The transition duct defines an entrance section that extends from the upstream blade row towards a diverging section that extends towards the leading edge.

In addition to one or more of the features described above, or as an alternative to any of the foregoing embodiments, the entrance section has an entrance annular area.

In addition to one or more of the features described above, or as an alternative to any of the foregoing embodiments, the transition duct includes a first outlet having a first annular area and a second outlet having a second annular area.

In addition to one or more of the features described above, or as an alternative to any of the foregoing embodiments, a combination of the first annular area and the second annular area is greater than the entrance annular area.

In addition to one or more of the features described above, or as an alternative to any of the foregoing embodiments, an outer duct is defined between the outer flow path wall and the first surface and extends from the leading edge towards the second case end.

In addition to one or more of the features described above, or as an alternative to any of the foregoing embodiments, an inner duct is defined between the inner flow path wall and the second surface and extends from the leading edge towards the second case end.

Also disclosed is a gas turbine engine that includes a case assembly, a splitter, an outer duct, an inner duct, and a transition duct. The case assembly defines an outer flow path wall and an inner flow path wall, each extending between a first case end and a second case end along a central longitudinal axis. The splitter is disposed between the outer flow path wall and the inner flow path wall. The splitter has a first surface and a second surface, each extending from a leading edge. The outer duct is defined between the outer flow path wall and the first surface and extends from the leading edge towards the second case end. The inner duct is defined between the inner flow path wall and the second surface and extends from the leading edge towards the second case end. The transition duct extends from the first case end towards the outer duct and the inner duct. The transition duct defines an entrance section and a diverging section that extends from the entrance section towards the outer duct and the inner duct.

In addition to one or more of the features described above, or as an alternative to any of the foregoing embodiments, the entrance section has an entrance annular area.

In addition to one or more of the features described above, or as an alternative to any of the foregoing embodiments, the diverging section includes a first transition duct outlet that is connected to the outer duct and a second transition duct outlet that is connected to the inner duct.

In addition to one or more of the features described above, or as an alternative to any of the foregoing embodiments, the transition duct has an axial length that extends between the entrance section and at least one of the first transition duct outlet and the second transition duct outlet.

In addition to one or more of the features described above, or as an alternative to any of the foregoing embodiments, the inner duct has an inner duct inlet having an inner duct radial height.

In addition to one or more of the features described above, or as an alternative to any of the foregoing embodiments, the outer duct has an outer duct inlet having an outer duct radial height.

In addition to one or more of the features described above, or as an alternative to any of the foregoing embodiments, the axial length of the transition duct is greater than at least one of the inner duct radial height and the outer duct radial height.

In addition to one or more of the features described above, or as an alternative to any of the foregoing embodiments, an upstream blade row is disposed proximate the first case end and extends between the outer flow path wall and the inner flow path wall.

In addition to one or more of the features described above, or as an alternative to any of the foregoing embodiments, the axial length of the transition duct is greater than a limiting value such that airflow through the upstream blade row and the downstream blade row remains substantially undisturbed and the boundary layers within the transition duct remain substantially unseparated in response to a change in a bypass ratio of the gas turbine engine.

In addition to one or more of the features described above, or as an alternative to any of the foregoing embodiments, the first transition duct outlet has a first annular area and the second transition duct outlet has a second annular area.

In addition to one or more of the features described above, or as an alternative to any of the foregoing embodiments, a combination of the first annular area and the second annular area is greater than the entrance annular area.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
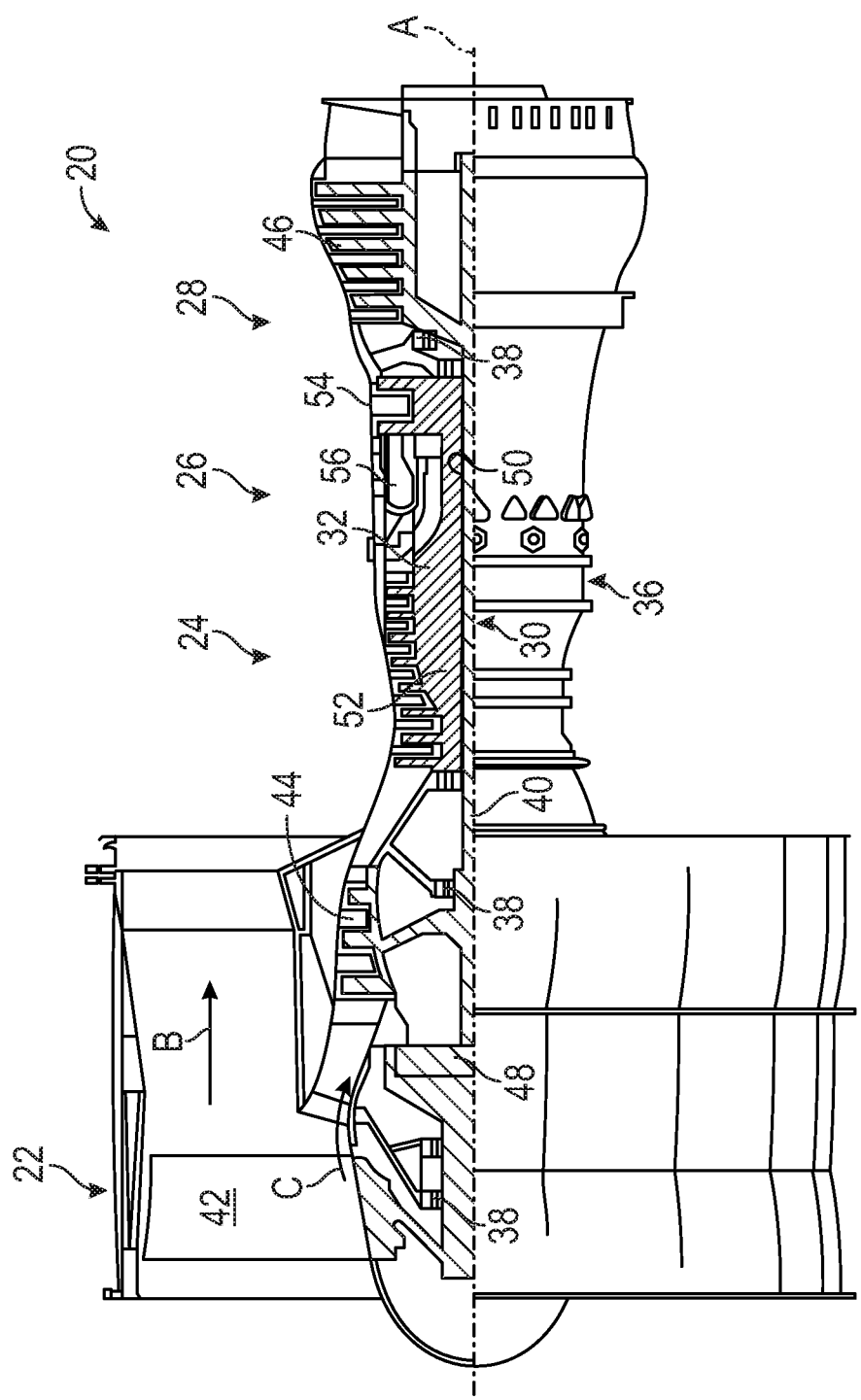
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features that include additional, independent bypass streams. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The present disclosure relates to a turbofan engine wherein a transition duct is provided to facilitate swings or changes in bypass ratio with minimum impact on the flow in upstream and downstream blade rows or stages, enabling the stages to operate at optimum performance. Bypass ratio as used in the present disclosure is a ratio between the mass flow rate in an outer duct and a mass flow rate in an inner duct.

The gas turbine engine 20 may incorporate a fan architecture in which changes or variations in a bypass ratio may occur between an upstream stage or an upstream blade row 60 and a downstream stage or a downstream blade row 62 relative to the fan 42. The upstream blade row 60 or the downstream blade row 62 may include a rotor blade/airfoil or a stator blade/airfoil. The upstream blade row 60 may be disposed upstream of the downstream blade row 62 such that the upstream blade row 60 is an upstream stage and the downstream blade row 62 is a downstream stage. Changes in the bypass ratio may impact performance of the gas turbine engine 20 but may also result in losses in an outer duct and/or the downstream blade row 62 as well as negatively impact the stall margin of the fan 42. Therefore, a transition duct 70 may be provided to accommodate flow area differences between upstream and downstream components of the gas turbine engine 20 as well as to minimize the impact of bypass variations on the performance of the upstream blade row 60.

Figure 2:
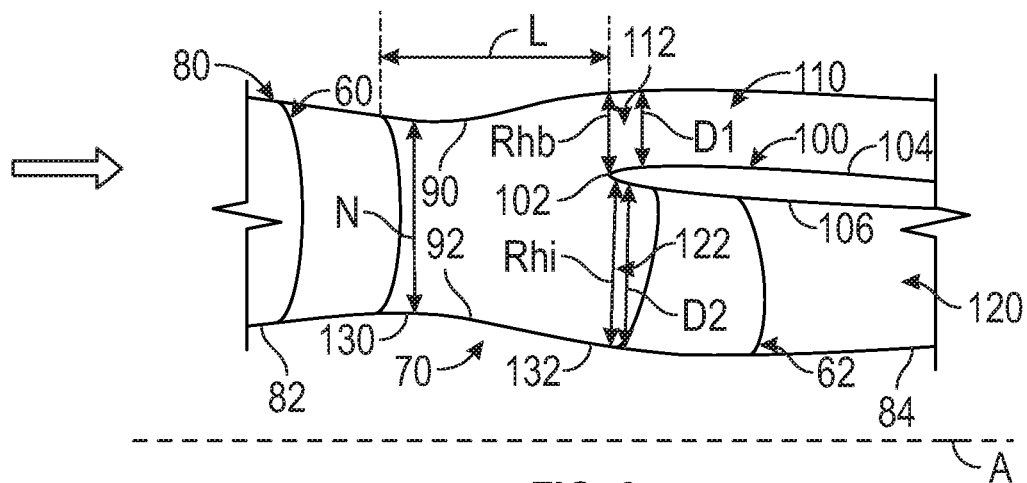
FIG. 2 is a partial section view of a transition duct of the gas turbine engine.

The bypass configuration of the gas turbine engine 20 relates to a gas turbine engine having more than one bypass stream that is characterized by at least two generally independent bypass ratios—one bypass ratio proximate a first splitter associated with a first fan stage (e.g. front fan bypass ratio), and another bypass ratio proximate a second splitter associated a second or downstream fan stage (e.g. rear fan bypass ratio). The front fan bypass ratio may be controlled over a wide range, thus facilitating the optimization of the overall propulsion system efficiency to a particular flight mode (e.g. takeoff and high-power climb and/or high acceleration, or cruise). A wide variability of the front fan bypass ratio, typically accompanied by a large range in the swirl angle in the flow at the exit of the front fan, may require the use of a transition duct 70. If the front fan bypass ratio were fixed over the operating envelope of the engine, there would be no need for the transition duct 70 as it would be possible to locate the 1st splitter close to the trailing edge of the upstream blade row with Rhi+Rhb=N, as shown in FIG. 2. The transition duct 70 may be applicable to traditional two-stream engine architectures if the operating envelope of the engine were to include significant variations of a (single) bypass ratio. Some gas turbine engines may be arranged to vary or modify the bypass ratio in order to achieve improved overall propulsion system efficiency. Alternatively, the varying or modifying of the bypass ratio may achieve a significant reduction in mission-weighted fuel burn.

Figure 3:
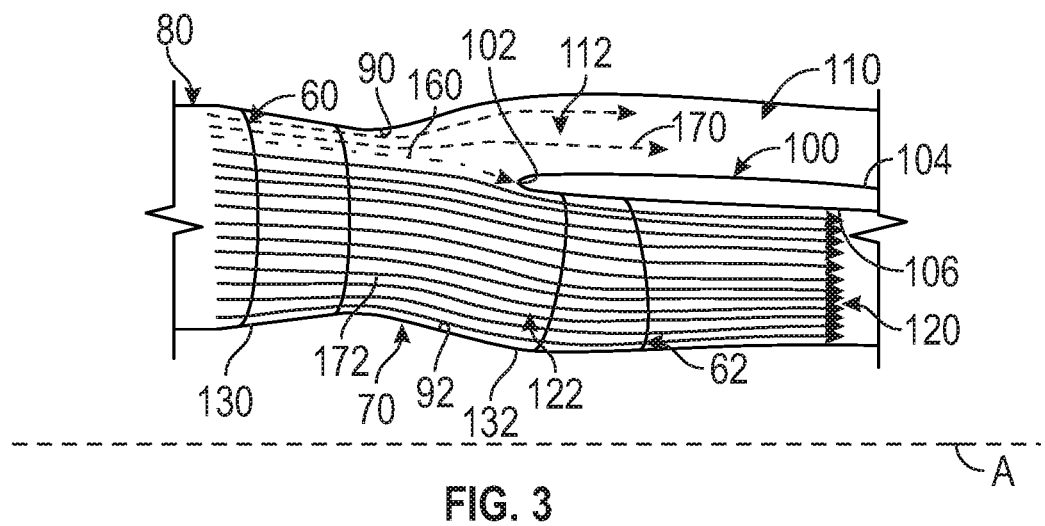
FIG. 3 is a view of the gas turbine engine operating at a first bypass ratio, depicting streamlines through the transition duct.
Figure 4:
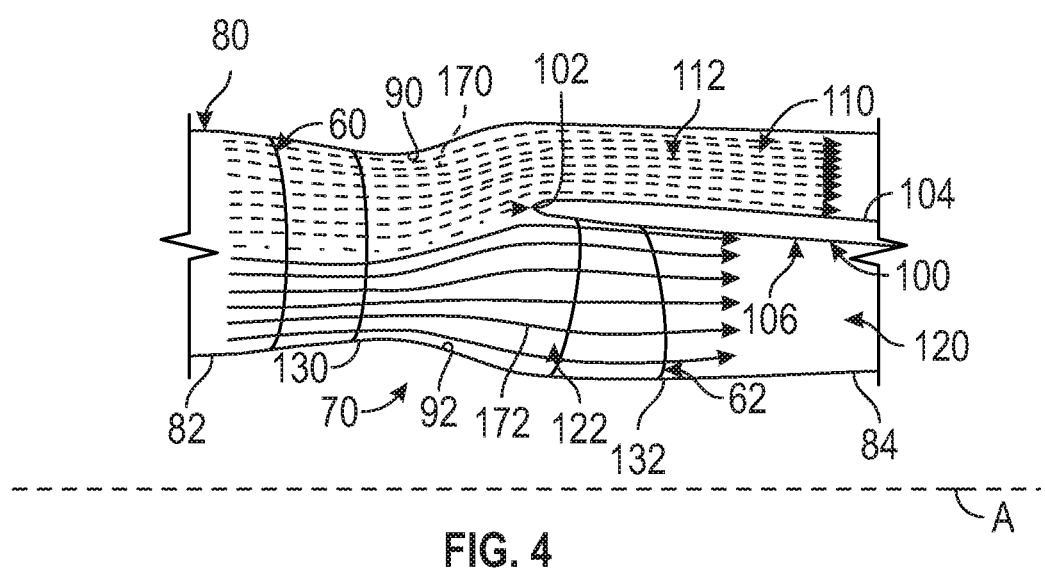
FIG. 4 is a view of the gas turbine engine operating at a second bypass ratio, depicting streamlines through the transition duct.

Referring to FIGS. 2-4, a case assembly 80 may house at least a portion of the upstream blade row 60 and the downstream blade row 62. The case assembly 80 is disposed about the central longitudinal axis A and extends between a first case end 82 and a second case end 84 along the central longitudinal axis A. The case assembly 80 defines an outer end wall or an outer flow path wall 90 and an inner end wall or an inner flow path wall 92 that is disposed radially inboard of the outer flow path wall 90. The outer flow path wall 90 and inner flow path wall 92 each extend between the first case end 82 and the second case end 84 along the central longitudinal axis A. The upstream blade row 60 may be disposed proximate the first case end 82 and extends between the outer flow path wall 90 and the inner flow path wall 92.

Flow from the upstream blade row 60 may have a swirl element therefore the end walls (e.g. the outer flow path wall 90 and the inner flow path wall 92) are contoured to inhibit boundary layer separation due to the swirl element.

A splitter 100 is disposed between the outer flow path wall 90 and the inner flow path wall 92. The splitter 100 may be provided as part of the case assembly 80 or may be provided as a separate component. The splitter 100 includes a splitter nose or a leading edge 102, a first surface 104, and a second surface 106 that is disposed opposite the first surface 104. The first surface 104 and the second surface 106 each extend from the leading edge 102 towards the second case end 84 along the central longitudinal axis A.

A bypass duct or an outer duct 110 is defined between the outer flow path wall 90 and the first surface 104 of the splitter 100. The outer duct 110 extends from the leading edge 102 towards the second case end 84. The outer duct 110 is arranged to receive bypass flow. The outer duct 110 includes an outer duct inlet 112 that is disposed proximate the leading edge 102. The outer duct inlet 112 having an outer duct radial height, Rhb, or an outer flow path radius at the leading edge 102 relative to the central longitudinal axis, A. The outer duct inlet 112 may correspond to a first transition duct outlet.

An inner duct 120 is defined between the inner flow path wall 92 and the second surface 106 of the splitter 100. The inner duct 120 extends from the leading edge 102 towards the second case end 84. The inner duct 120 is arranged to receive the inner flow stream passing under the splitter 100, as shown in FIGS. 3 and 4. The downstream blade row 62, which is downstream or aft of the transition duct 70, may be disposed proximate the inner duct 120 and extends between the inner flow path wall 92 and the second surface 106 of the splitter 100. The inner duct 120 includes an inner duct inlet 122 having an inner duct radial height, Rhi, or an inner flow path radius at the leading edge 102 relative to the central longitudinal axis, A. The inner duct inlet 122 may correspond to a second transition duct outlet.

The transition duct 70 may be provided with an upstream compression stage or stages, including but not limited to the fan section 22. The transition duct 70 is defined between or defined by the outer flow path wall 90 and inner flow path wall 92 of the case assembly 80. The transition duct 70 extends between the upstream blade row 60 and the leading edge 102 such that the transition duct 70 extends from the first case end 82 towards the outer duct inlet 112 and the inner duct inlet 122. The transition duct 70 is arranged to facilitate the radial re-distribution of the flow associated with wide bypass ratio swings while providing low loss and minimum disturbance to the flow field in the upstream blade row 60 and the downstream blade row 62. The transition duct 70 may accommodate a wide range in the swirl angle of the flow entering the transition duct 70 from the upstream blade row 60.

The transition duct 70 includes an entrance section 130 and a diverging section 132 that extends from the entrance section 130 along a longitudinal axis.

The entrance section 130 is defined by an entrance annular area N or is defined by entrance inner and outer flowpath radii proximate the trailing edge of the upstream blade row 60 relative to the central longitudinal axis, A. The entrance section 130 may include a slight contraction in order to provide a smooth flow path transition from the upstream blade row 60 into the transition duct 70 prior the radial re-distribution of the flow associated with wide bypass ratio swings in the diverging section 132.

The diverging section 132 extends from the entrance section 130 towards the leading edge 102 and the outer duct 110 and the inner duct 120. The diverging section 132 may diverge axis symmetrically to facilitate the changes in bypass ratio and splitting of the flow into the outer duct 110 to the inner duct 120. The diverging section 132 includes the first transition duct outlet that is connected to the outer duct 110 and the second transition duct outlet that is connected to the inner duct 120. There is an area mismatch between the inlet to the transition duct 70 (e.g. the entrance section 130), N, and the outlet of the transition duct (e.g. the first transition duct outlet and the second transition duct outlet), D1 and D2.

The first transition duct outlet or the outer duct inlet 112 has a first annular area, D1. The second transition duct outlet or the inner duct inlet 122 has a second annular area, D2. The second annular area, D2, may be greater than the first annular area, D1. A combination of the first annular area, D1, and the second annular area, D2, is greater than the entrance annular area, N. In such an arrangement, the total annular area proximate the leading edge 102 (e.g. D1 and D2) is greater than the entrance annular area, N, to facilitate the optimization of the flow path contraction in the upstream blade row 60 (e.g. the upstream blade rows) to maximize performance and to meet stall margin requirements for the fan 42, while allowing for ample or sufficient flow area in the outer duct 110 and the inner duct 120 to minimize downstream losses in the downstream blade row 62 (e.g. the downstream blade rows).

The transition duct 70 has an axial length, L, which is measured between or extends between a trailing edge of the upstream blade row 60 and the leading edge 102 of the splitter 100. The axial length, L, is greater than at least one of the outer duct radial height, Rhb, and the inner duct radial height, Rhi. The axial length, L, of the transition duct 70 is to be sufficient such that airflow through the upstream blade row 60 remains substantially undisturbed and the boundary layers within the transition duct 70 remain substantially unseparated from the flow path walls in response to a change in a bypass ratio of the gas turbine engine 20, as shown in FIGS. 3 and 4.

FIG. 3 depicts streamlines through the transition duct 70 of the gas turbine engine 20 while the engine is operating at a first bypass ratio or a low bypass ratio. A splitting streamline 160, terminating at a stagnation point near the leading edge or leading edge 102 of the splitter 100 represents the division of the flow exiting the upstream blade row 60 into the inner and outer streams. The flow below the splitting streamline 160 enters the inner duct 120 at the splitter 100, while the flow above the splitting streamline 160 enters the outer duct 110 at the splitter 100. A stream tube defined by the splitting streamline 160 and the outer wall of transition duct 70 represents a "small" fraction of the total flow through the upstream blade row 60 at the "low" bypass ratio and the streamlines 170 above the splitting streamline 160 are seen to exhibit significant divergence approaching the entrance to the outer duct 110. It is to be noted that the transition duct 70 facilitates this divergence to occur downstream of upstream blade row 60, thus eliminating any effects on the flow field within upstream blade row 60. Concurrently, the flow below the splitting streamline 160 is depicted by the streamlines 172 as accelerating into the entrance of the inner stream to the inner duct 120 at the "low" bypass ratio, with the associated radial shift of the streamlines 172 also occurring within the transition duct 70, eliminating any effects on the flow field in the upstream blade row 60. The transition duct 70 thus facilitates the overall radially-inward shift of the flow into the inner duct inlet 122 at the "low" bypass ratio operating point without introducing any disturbance in the flow in upstream blade row 60, allowing for optimum operation of the upstream blade row 60.

FIG. 4 depicts streamlines through the transition duct 70 of the gas turbine engine 20 while the engine is operating at a second bypass ratio or a high bypass ratio. Consistent with the "high" bypass ratio, and contrary to the "low" bypass ratio operating condition depicted in FIG. 3, an overall radially-outward shift (e.g. towards the outer flow path wall 90) in the streamlines 170 occurs. The streamlines 170 above the splitting streamline 160 are accelerating into the entrance of the outer stream to the outer duct 110 at the "high" bypass ratio. The streamlines 172 below the splitting streamline 160, are seen to exhibit significant divergence approaching the entrance to the inner duct 120.

As in the "low" bypass ratio condition (FIG. 3), the radial adjustment of the streamlines occurs within the transition duct 70, thus eliminating any disturbance of the flow through the upstream blade row 60, facilitating the optimum operation of the upstream blade row 60.

The axial length, L, of the transition duct 70 and the larger combined annular area of the transition duct 70, D1 and D2, proximate the leading edge 102 as compared to the entrance section area, N, optimizes end wall loading on the upstream blade row 60 and the downstream blade row 62. Furthermore the annular area mismatch between the entrance section 130 and the outer duct inlet 112 and inner duct inlet 122 optimizes flow convergence proximate the upstream blade row 60 and provides low losses in the outer duct 110 and the inner duct 120. Furthermore, the axial spacing between the upstream blade row 60 and the downstream blade row 62 by the transition duct 70 minimizes flow distortion associated with bypass ratio swings seen by the upstream blade row 60. Furthermore, the axial length, L, inhibits end wall boundary layer separation that may lead to loss of performance or structural excitation of downstream elements.

The annular area, N, at the entrance section 130 is sized based on desired loading on the upstream blade row 60. The annular area of an exit of the transition duct 70 to the outer duct inlet 112, D1, is sized for a maximum bypass condition and is oversized for a minimum bypass condition. The annular exit of the transition duct 70 to the inner duct inlet 122, D2, is sized for the minimum bypass condition and is oversized for the maximum bypass condition. As arranged, the sum of the annular area of the first transition duct outlet (D1) and the annular area of the second transition duct outlet (D2) is substantially greater than the annular area of the transition duct entrance section 130 (N), in order to facilitate the large bypass ratio variations. The substantially larger combined annulus areas at the exit of the transition duct in comparison to the annulus area at the inlet to the transition duct is enabled through a significant divergence of the transition duct walls over transition duct axial length L. The diverging of the flow in the transition duct 70 occurs along the inner wall of the diverging section 132 at the high bypass conditions (as depicted by the divergence of the inner stream tube, in FIG. 4) combined with high swirl originating in the upstream blade rows, and likewise near the outer wall of the transition duct 70 at low bypass conditions, as depicted by the divergence of the outer stream tube in FIG. 3. A limiting value of the transition duct length, L, exists below which significant boundary layer separation would occur on one or both of the outer or inner transition duct walls 90, 92 leading to high losses and detrimental performance and structural excitation effects on the downstream blade rows. The transition duct length must therefore be greater than this minimum value.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
a case assembly defining an outer flow path wall and an inner flow path wall, each extending between a first case end and a second case end along a central longitudinal axis;
a splitter disposed between the outer flow path wall and the inner flow path wall, the splitter having a first surface and a second surface disposed opposite the first surface, each extending from the second case end towards a leading edge;
an upstream blade row disposed proximate to the first case end and extending between the outer flow path wall and the inner flow path wall; and
a transition duct defined by the outer flow path wall and the inner flow path wall and extending from the upstream blade row to the leading edge, the outer flow path wall and the inner flow path wall defining a diverging section that extends from an entrance section towards the leading edge, the entrance section having a contracting entrance annular area adjacent to and downstream from the upstream blade row, the outer flow path wall defining the diverging section extends radially outward and the inner flow path wall defining the diverging section extends radially inward, and the diverging section having an outer duct outlet with a first annular area proximate to the leading edge and an inner duct outlet with a second annular area proximate to the leading edge, the second annular area being greater than the first annular area, wherein a combination of the first annular area and the second annular area is greater than the entrance annular area.

2. The gas turbine engine of claim 1, wherein an inner duct is defined between the inner flow path wall and the second surface and extends from the leading edge towards the second case end.

3. The gas turbine engine of claim 1, wherein an outer duct is defined between the outer flow path wall and the first surface and extends from the leading edge towards the second case end.

4. The gas turbine engine of claim 3, wherein an inner duct is defined between the inner flow path wall and the second surface and extends from the leading edge towards the second case end.

5. A gas turbine engine comprising:
- a case assembly defining an outer flow path wall and an inner flow path wall, each extending between a first case end and a second case end along a central longitudinal axis;
- a splitter disposed between the outer flow path wall and the inner flow path wall, the splitter having a first surface and a second surface, each extending from a leading edge;
- an outer duct defined between the outer flow path wall and the first surface and extending from the leading edge towards the second case end;
- an inner duct defined between the inner flow path wall and the second surface and extending from the leading edge towards the second case end; and
- a transition duct extending from the first case end towards the outer duct and the inner duct, the transition duct defining an entrance section and a diverging section that extends from the entrance section towards the outer duct and the inner duct, the entrance section having a contracting entrance annular area, the diverging section being defined by the outer flow path wall and the inner flow path wall, the outer flow path wall extending radially outward and the inner flow path wall extending radially inward, the diverging section having an outer duct outlet with a first annular area proximate to the leading edge and an inner duct outlet with a second annular area proximate to the leading edge, the second annular area being greater than the first annular area, wherein a combination of the first annular area and the second annular area is greater than the entrance annular area.

6. The gas turbine engine of claim 5, wherein the outer duct outlet is connected to the outer duct and the inner duct outlet is connected to the inner duct.

7. The gas turbine engine of claim 6, wherein the transition duct has an axial length that extends between the entrance section and at least one of the outer duct outlet and the inner duct outlet.

8. The gas turbine engine of claim 7, wherein the inner duct has an inner duct inlet having an inner duct radial height.

9. The gas turbine engine of claim 8, wherein the outer duct has an outer duct inlet having an outer duct radial height.

10. The gas turbine engine of claim 9, wherein the axial length of the transition duct is greater than at least one of the inner duct radial height and the outer duct radial height.

11. The gas turbine engine of claim 9, wherein an upstream blade row is disposed upstream from the entrance section and proximate to the first case end and the upstream blade row extends between the outer flow path wall and the inner flow path wall.

12. The gas turbine engine of claim 11, wherein the axial length of the transition duct is greater than a limiting value and the transition duct is configured such that airflow through the upstream blade row and a downstream blade row remains undisturbed and a boundary layer within the transition duct remains unseparated in response to a change in a bypass ratio of the gas turbine engine.

\* \* \* \* \*